United States Patent [19]
Fukunaga et al.

[11] Patent Number: 5,006,948
[45] Date of Patent: Apr. 9, 1991

[54] DISK CARTRIDGE WITH IMPROVED CLEANING MECHANISM

[75] Inventors: Kazuya Fukunaga, Toride; Yoshitake Kato, Ibaraki, both of Japan; Hiroyuki Yoshimura, Bonita, Calif.

[73] Assignee: Hitachi Maxell Ltd., Osaka, Japan

[21] Appl. No.: 243,688

[22] Filed: Sep. 13, 1988

[30] Foreign Application Priority Data

Sep. 14, 1987 [JP] Japan ................... 62-228529

[51] Int. Cl.⁵ ........................................ G11B 23/033
[52] U.S. Cl. .................................................. 360/133
[58] Field of Search ............... 360/133, 135; 206/444, 206/312, 313; 369/289, 291

[56] References Cited

U.S. PATENT DOCUMENTS

| | | | |
|---|---|---|---|
| 4,482,929 | 11/1984 | Beck et al. | 360/133 |
| 4,510,546 | 4/1985 | Asami et al. | |
| 4,654,742 | 3/1987 | Harris et al. | 360/133 |
| 4,688,129 | 8/1987 | Gruehn et al. | 360/133 |
| 4,734,815 | 3/1988 | Nagarawa et al. | 360/133 |
| 4,750,075 | 6/1988 | Oishi | 360/133 |
| 4,814,926 | 3/1989 | Gulbrandser | 360/133 |

FOREIGN PATENT DOCUMENTS

| | | | |
|---|---|---|---|
| 0013484 | 1/1986 | Japan | 360/133 |
| 0085685 | 5/1986 | Japan | 206/313 |
| 0278094 | 12/1986 | Japan | 360/133 |
| 2161314 | 1/1986 | United Kingdom . | |

Primary Examiner—David J. Severin
Attorney, Agent, or Firm—Birch, Stewart, Kolasch & Birch

[57] ABSTRACT

A disk cartridge comprises a cartridge case including an upper case, a lower case and a head insertion aperture at a predetermined position, a pair of cleaning sheets respectively secured to inner surfaces of the upper and lower cases, a disk disposed rotatably between the cleaning sheets, and a resilient member disposed between at least one of the cases and associated cleaning sheet, the resilient member being adapted to press a part of the cleaning sheet against a disk surface, wherein the resilient member is disposed in the vicinity of the head insertion aperture and upstream of the head inserting port in the rotational direction of the disk, thereby enhancing the effect of cleaning of the disk surfaces to be read/written by the magnetic head.

5 Claims, 7 Drawing Sheets

DISK CARTRIDGE WITH IMPROVED CLEANING MECHANISM

BACKGROUND OF THE INVENTION

The present invention relates to a disk cartridge such as a magnetic disk cartridge, an optical disk cartridge, or a magneto-optical disk cartridge, and more particularly to a disk cartridge in which an inclined portion of a resilient member is adapted to resiliently bring a part of a cleaning sheet into contact with the disk of the cartridge so as to clean the surface of the disk.

FIG. 9 is a bottom view of an upper case with a cleaning sheet attached thereto in a conventional magnetic disk cartridge. FIG. 10 is a top plan view of a lower case with the cleaning sheet attached thereto in the magnetic disk cartridge. FIG. 11 is an enlarged cross-sectional view illustrating a state where the upper and lower cases of the magnetic disk cartridge are subjected to ultrasonic welding. FIG. 12 is an enlarged cross-sectional view of a resilient member disposed in the magnetic disk cartridge.

The magnetic disk cartridge mainly comprises a cartridge case 1, a magnetic disk 2 (see FIG. 12) accommodated rotatably therein, and a shutter (not shown) supported slidably by the cartridge case 1 and adapted to open and close head insertion ports or apertures 5.

The cartridge case 1 comprises an upper case 1a and a lower case 1b which are formed of a hard synthetic resin, such as ABS resin. As shown in FIG. 10, an opening 4 in which a rotating and driving shaft is inserted is formed substantially in the center of the lower case 1b, and the head insertion port 5 having a rectangular shape is provided in the vicinity thereof. The upper case 1a is similarly provided with the head insertion port 5 (see FIG. 9).

A plurality of protrusions 3 arranged in parallel at predetermined positions and arcuate restricting ribs 6 for restricting the accommodation position of the magnetic disk 2 are provided on an inner surface of the upper case 1a. A cleaning sheet 7 made of, for instance, a non-woven fabric formed of a mixture of rayon fibers and polyester fibers, is placed in a space surrounded by the restricting ribs 6. Since the cleaning sheet 7 is thus placed, the protrusions 3 are covered with the cleaning sheet 7, and the peripheral portion of the cleaning sheet 7 is heat-bonded to the upper case 1a at a portion 9 by means of ultrasonic welding or a similar method.

As shown in FIGS. 10 and 12, a protruding support 10 and adhesion preventing protrusions 11 are provided on the inner surface of the lower case 1b and at a position substantially opposing the protrusions 3 of the upper case 1a. In addition, a proximal end portion 13 of a resilient member 12 formed by bending a plastic sheet into the form of a chevron is secured to the inner surface of the lower case 1b in the vicinity of the support 10 by a suitable means, such as bonding or welding. The distal end portion of the resilient member 12 is provided with an inclined portion 14 which projects in such a manner as to be inclined relative to the lower case 1b.

The lower case 1b is also provided with the restraining ribs 6 in the same way as the upper case 1a, and the cleaning sheet 7 is placed on the inner side thereof. Since the cleaning sheet 7 is thus placed, the resilient member 12 is covered, and most of the peripheral portion of the cleaning sheet 7 is welded or heat-bonded to the lower case 1b at the portion 9. However, a portion of the peripheral portion of the cleaning sheet 7 opposed to the opposite side ends of the resilient member 12 is not heat-bonded.

As shown in FIG. 9, bosses 15 are provided in the vicinity of the four corners of the upper case 1a, and, as shown in FIG. 10, cylindrical portions 16 into which the bosses 15 are inserted are provided in the vicinity of the four corners of the lower case 1b, respectively. As shown in FIG. 11, a portion 17, an allowance for welding is formed at the tip portion of each of the bosses 15, and the bosses 15 are respectively inserted into the cylindrical portions 16 with the portions 17, for fusion, facing downward. Subsequently, as ultrasonic energy is supplied to contacting portions of the boss 15 and the cylindrical portion 16, the portions 17 are melted, and the tip portions of the bosses 15 are thereby bonded to the inner bottom surfaces of the cylindrical portions 16.

If the disk cartridge is assembled by bonding together the upper case 1a and the lower case 1b as a unit, the cleaning sheet 7 on the side of the lower case 1b is partially lifted by the inclined portion 14 of the resilient member 12, as shown in FIG. 12, while a part of the cleaning sheet 7 in the upper case 1a opposed to the lifted portion is slightly pushed downwardly by the protrusions 3 provided on the upper case 1a. Consequently, the magnetic disk 2 is clamped lightly and resiliently by the upper and lower cleaning sheets 7. Then, as the magnetic disk 2 rotates, the surfaces of the disk are cleaned by the cleaning sheets 7.

In cases where the resilient member 12 and the cleaning sheets 7 are used to clean the magnetic disk 2, the highest lifted portion of the cleaning sheet 7, lifted by the resilient member (inclined portion 14), i.e., point C in FIG. 12, has the largest cleaning effect, and this point C (which is a straight line in a plane parallel to the disk 2) is referred to as the cleaning position in this specification or description.

As shown in FIG. 10, in a conventional disk cartridge, the aforementioned resilient member 12 and the like are disposed in such a manner that this cleaning point C is located in a range of from 90 to 120 degrees upstream of a center line X of the head insertion port 5 in the rotating direction of the disk.

With the conventional disk cartridge thus arranged, at the time when the disk cartridge is inserted into the recording and reproducing apparatus, no problem is experienced when the magnetic head is brought into pressure contact with the magnetic disk 2 after the front or leading portion of the disk surface cleaned at the above-described cleaning position C has passed under the magnetic head. However, there are cases when the magnetic head is brought into pressure contact with the disk surface which has not yet been cleaned before the aforementioned cleaned front or leading portion passes below the magnetic head. If dust or the like attaches to this portion of disk surface, the dust or the like is contacted with the disk surface by the colliding force of the magnetic head and consequently becomes attached more firmly thereto, making it impossible to wipe it off with the cleaning sheets 7 and resulting in a permanent error or damage.

In the case of the conventional disk cartridge, the cleaning position C is located substantially upstream of the head insertion port 5 (at a position about 90 to 120 degrees away from the center axis X of the head insertion port 5).

Meanwhile, because of the simplified structure of the recording and reproducing apparatus, a recently available arrangement is provided such that, after insertion of the disk cartridge, the magnetic head is brought into pressure contact with the magnetic disk 2 at a relatively early timing.

For that reason, if the cleaning position C is substantially separated from the head insertion port 5, it takes time until the cleaned front portion passes under the magnetic head, so that the magnetic head is brought into pressure contact with the magnetic disk 2 relatively early before the above described time, resulting in a disadvantage such as the one described above.

Thus, in the case of the magnetic disk cartridge, the above-described problem occurs since the magnetic head is directly brought into pressure contact with the uncleaned magnetic disk 2. However, even in the case of an optical disk cartridge in which the optical head does not contact the disk, it is preferable to make the cleaned front portion of the disk pass below the optical head before the optical head accesses or contacts the disk.

In addition, in the case of the conventional disk cartridge, in the state shown in FIG. 10 where it is midway in an assembly process, both portions of the cleaning sheet forward and rearward of the resilient member 12 are bonded in a state in which the cleaning sheet 7 is partially raised and stretched.

However, if the upper case 1a and the lower case 1b are bonded, as shown in FIG. 12, the resilient member 12 is pushed down by the protrusions 3 of the upper case 1a, so that a slacked portion is created in the cleaning sheet 7, which has been tight, and creases occur. Since these creases are formed on the resilient member 12 which would have the largest cleaning effect, it is impossible to demonstrate a sufficient cleaning effect. However, if the amount of slackening of the cleaning sheet 7 is large, the state of the cleaning sheet is such that it becomes entangled with the rotating magnetic disk 2, so that there is a drawback in that the required rotational torque of the magnetic disk 2 is increased.

SUMMARY OF THE INVENTION

Accordingly, an object of the present invention is to provide a disk cartridge which is capable of overcoming the above-described disadvantages of the prior art while demonstrating a positive cleaning effect and high reliability in operation.

To this end, according to the present invention, there is provided a disk cartridge comprising a cartridge case including an upper case, a lower case and a head insertion aperture at a predetermined position, a pair of cleaning sheets respectively secured to inner surfaces of the upper and lower cases, a disk disposed rotatably between the cleaning sheets, and a resilient member disposed between at least one of the cases and an associated one of the cleaning sheets, the resilient member being adapted to press a part of the cleaning sheet against a disk surface, wherein the resilient member is disposed in the vicinity of and upstream to the head insertion aperture in the rotational direction of the disk.

BRIEF DESCRIPTION OF THE DRAWINGS

FIGS. 1 to 8 illustrate a magnetic disk cartridge in accordance with an embodiment of the present invention, in which:

FIG. 1 is a bottom view of an upper case with a cleaning sheet attached thereto;

FIG. 2 is a top plan view of a lower case with a cleaning sheet attached thereto;

FIG. 3 is an enlarged plan view of a cylindrical portion provided in a front portion of the lower case;

FIGS. 4 and 5 are partial cross-sectional views illustrating bonding between the cylindrical portion and a boss;

FIG. 6 is an enlarged top plan view of a cylindrical portion provided in a rear portion of the lower case;

FIG. 7 is a partial cross-sectional view illustrating the cylindrical portion and a boss;

FIG. 8 is an enlarged cross-sectional view of a resilient member and parts adjacent thereto; and FIGS. 9 to 12 are diagrams illustrating a conventional disk cartridge, in which:

FIG. 9 is a bottom view of an upper case with a cleaning sheet attached thereto;

FIG. 10 is a top plan view of a lower case with a cleaning sheet attached thereto;

FIG. 11 is a partial cross-sectional view illustrating bonding between a boss and a cylindrical portion; and FIG. 12 is a cross-sectional view of a resilient member and parts adjacent thereto.

DESCRIPTION OF THE PREFERRED EMBODIMENT

Figure 1:
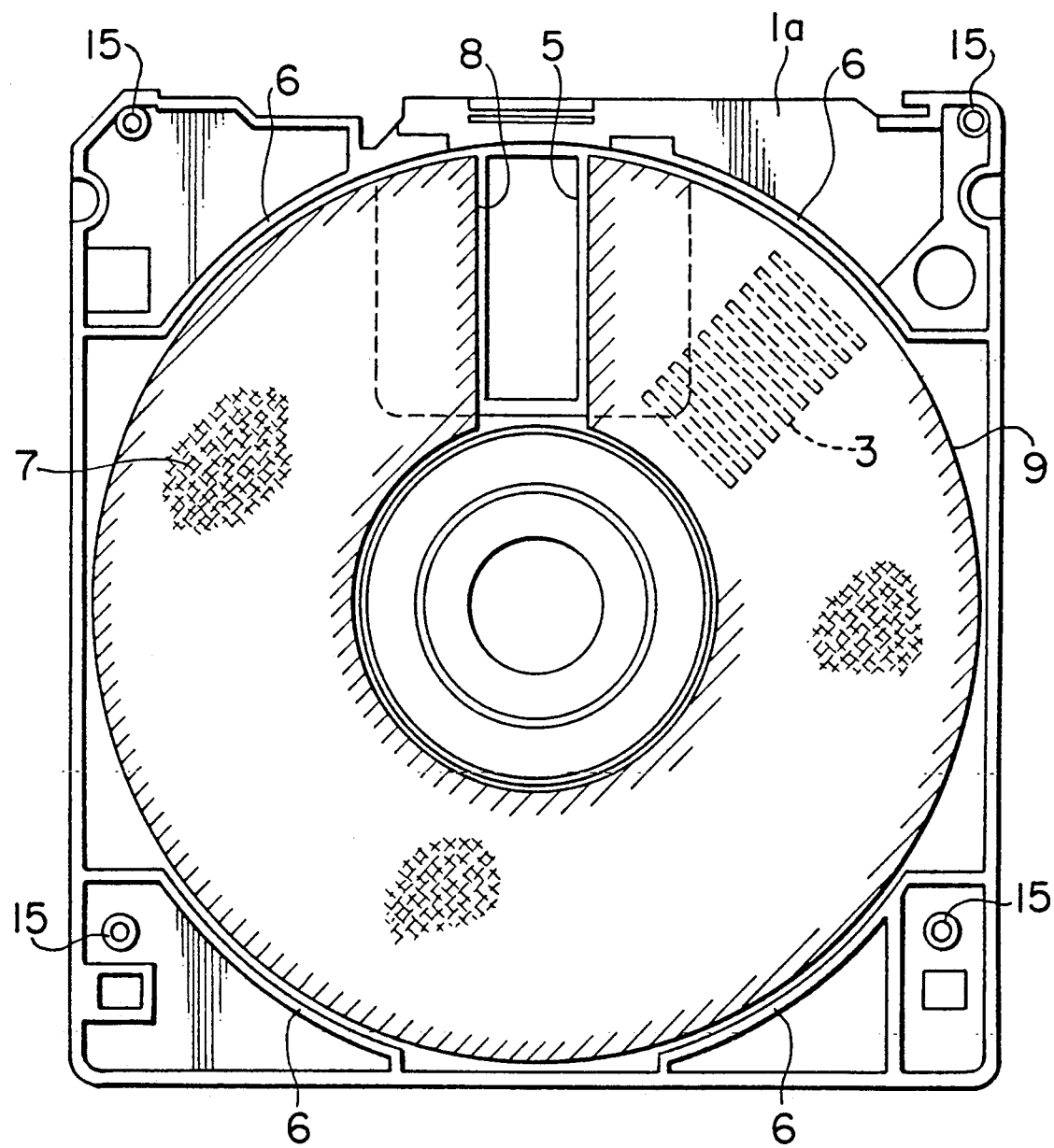

Referring now to FIGS. 1 to 8 a description will be given of an embodiment of the present invention.

A magnetic disk cartridge in accordance with the present invention differs from a conventional magnetic disk cartridge, shown in FIGS. 9 to 12, in the configuration of cylindrical portions 16 formed in a lower case 1b and the placement and installation of a resilient member 12 and protrusions 3, 10 and 11.

First, a description will be given of the configuration of the cylindrical portions 16. As shown in FIG. 3, the cylindrical portions 16 disposed on both sides of a front portion (upper side as viewed in FIG. 2) of the lower case 1b are respectively provided with arcuate ribs 18 each disposed on the cylindrical portion 16 and having an opening angle of about 100 degrees or more toward its side opposed to an area where a magnetic disk 2 rotates.

Figure 6:
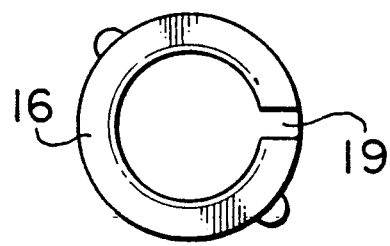

Meanwhile, as shown in FIG. 6, each of the cylindrical portions 16 disposed on both sides of a rear portion (lower side as viewed in FIG. 2) of the lower case 1b is provided with a slit 19 in a peripheral wall thereof on the side not facing the rotating area of the disk, the slit 19 being provided down to the vicinity of a foot of the peripheral wall.

Figure 4:
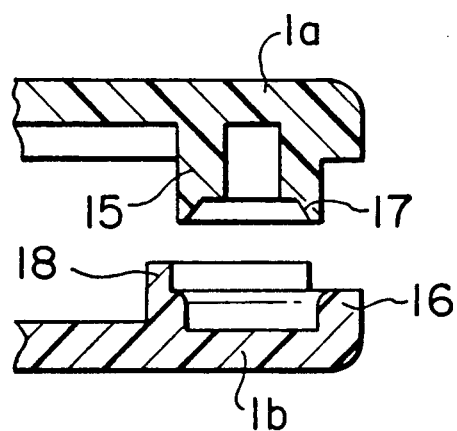
Figure 5:
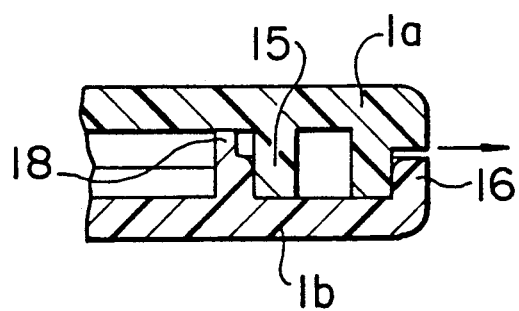
Figure 7:
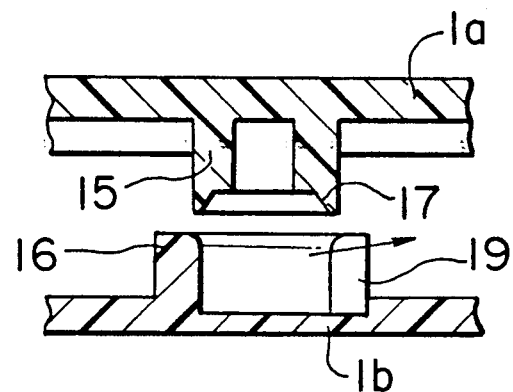

As shown in FIGS. 4 and 7, an annular portion 17 of allowance for fusion is formed at a tip portion of each boss 15 of the upper case 1a. When the cases 1a and 1b are bonded together, the front bosses 15 are respectively inserted into the corresponding front cylindrical portions 16, as shown in FIG. 4, and ultrasonic energy is supplied between the boss 15 and the cylindrical portion 16 to effect bonding. At this time, however, since the upper surface of the arcuate rib 18 is brought into contact with the inner surface of the upper case 1a, as shown in FIG. 5, the air containing fine particles of resin do not flow in the direction of the rotating area of the disk, but flows to the opposite side of the rotating area of the disk, as shown by the arrow.

In addition, as shown in FIG. 7, the rear boss 15 is inserted into the corresponding rear cylindrical portion 16, and ultrasonic energy is supplied between the boss 15 and the cylindrical portion 16 to effect bonding. At that time, the flowing direction of the air containing fine particles of resin is restricted to flow through the slit 19 in such manner as to be directed to the opposite side of the rotating area of the disk, as shown by the arrow in the drawing.

Figure 2:
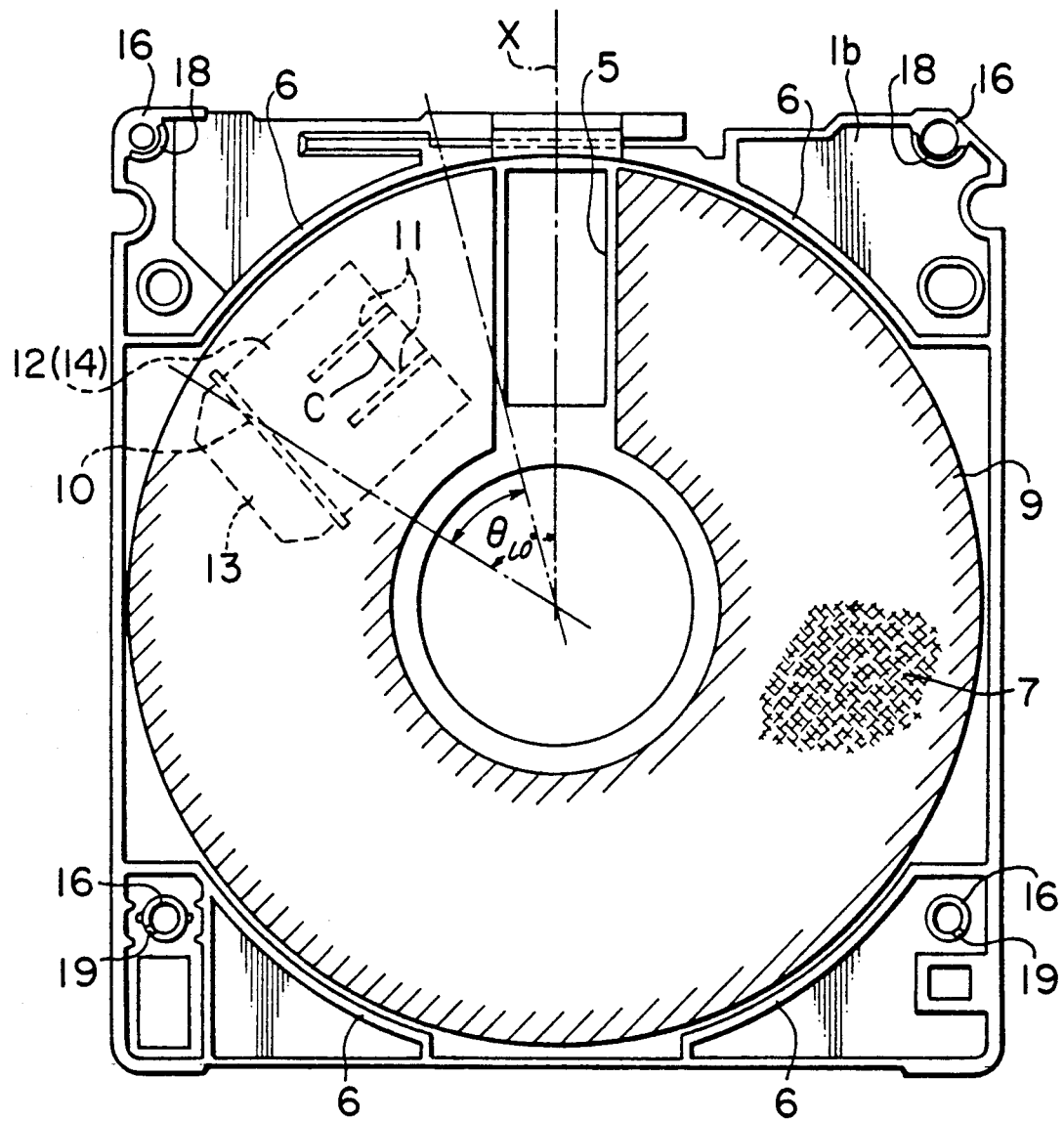
Figure 3:
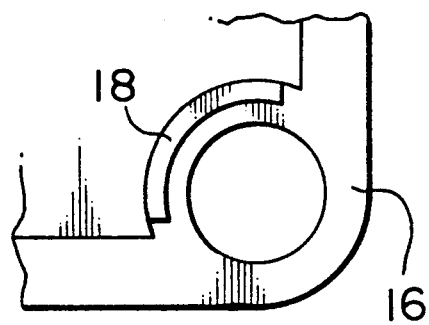
Figure 8:
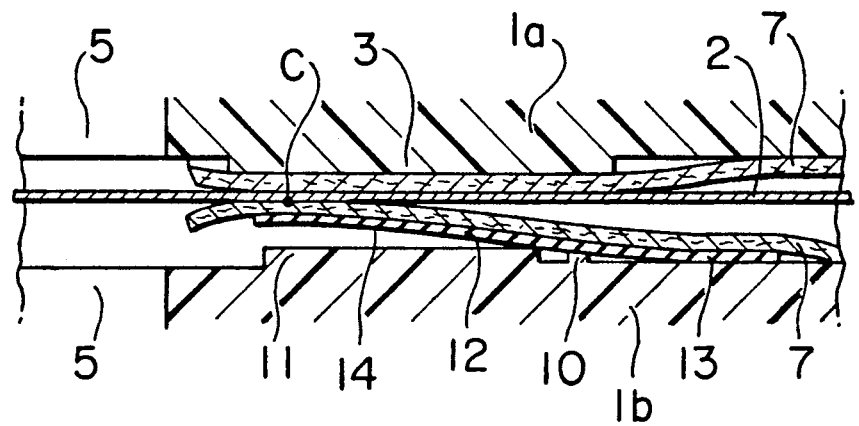
Figure 9:
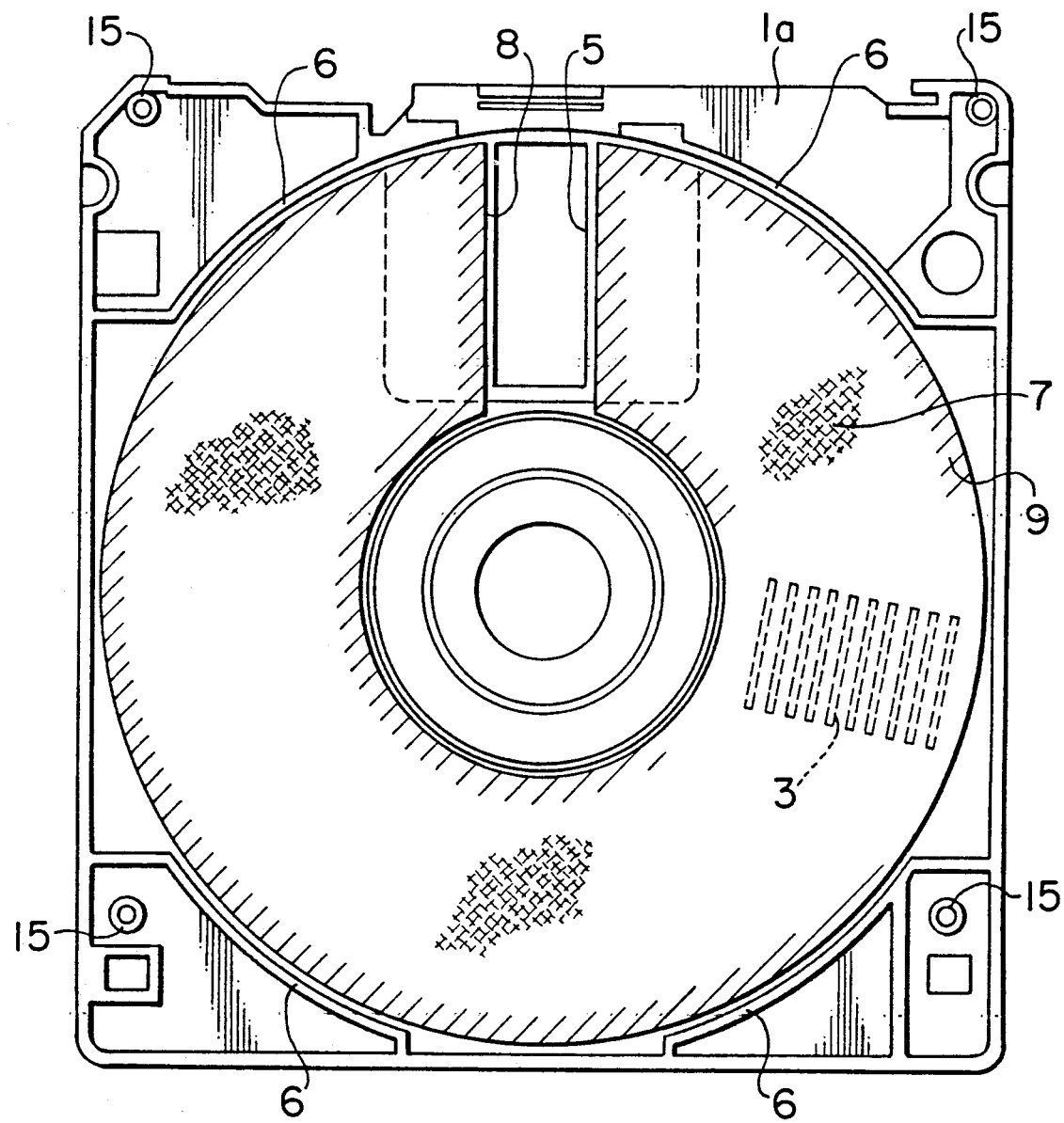
Figure 10:
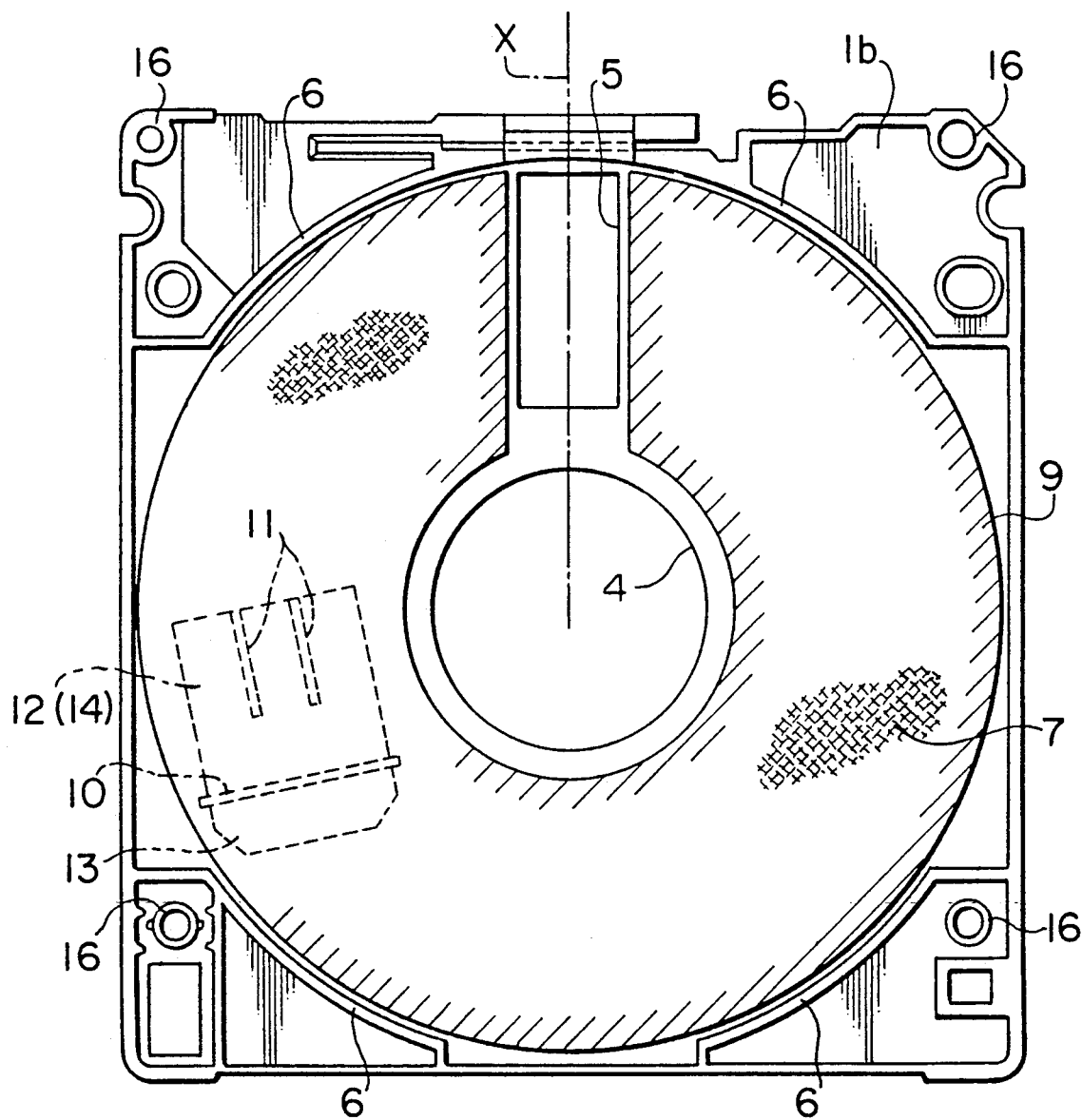
Figure 11:
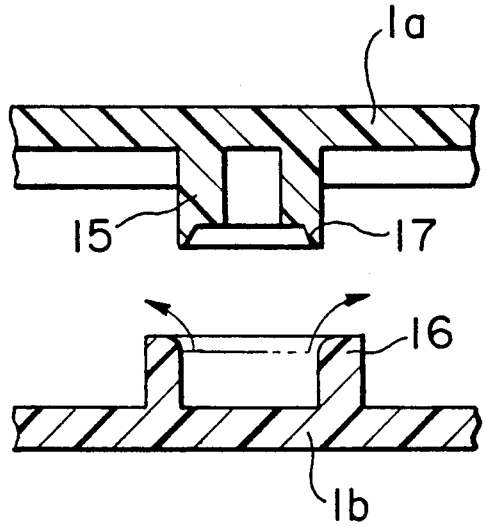
Figure 12:
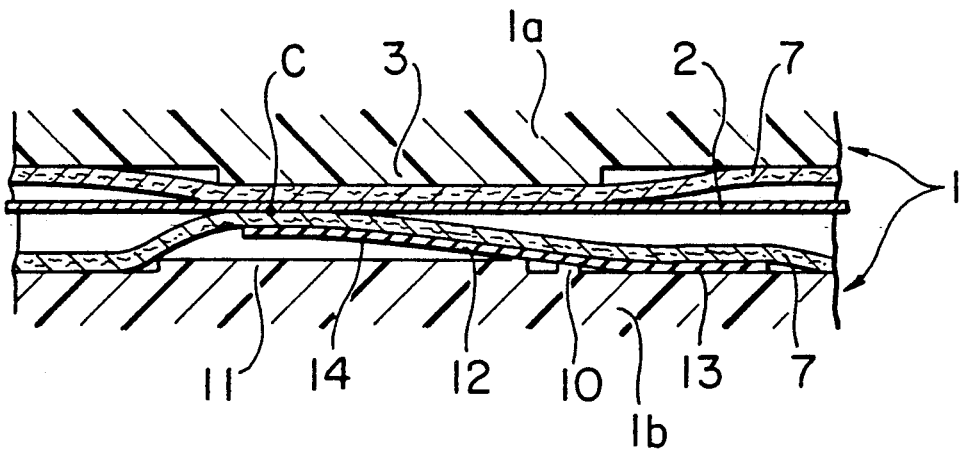

Referring now to FIGS. 1, 2 and 8, a description will be given of the places of installation of the resilient member 12 and protrusions 3.

As shown in FIG. 2, a plurality of protrusions 11 each having a protruding length of about 12.5 mm and a protruding support 10 having a protruding length of 20 mm and extending in a direction perpendicular to the protrusions are provided on the inner surface of the lower case 1b in the vicinity of the head insertion aperture or port 5. In addition, the resilient member 12 formed by bending a plastic resin made of a polyester sheet with a thickness of about 12.5 μm into the shape of a chevron is secured to be resiliently extended at a region above the support 10 and the protrusions 11, as in the case of a conventional apparatus. A portion of a cleaning sheet 9, which is formed of a non-waven fabric such as rayon fibers or polyester fibers and having a thickness of about 300 μm and which extends from the vicinity of the resilient member 12 to its edge, opposed to the head insertion port 5, is not secured by heat bonding and is made free. For this resilient member 12, a sponge body, a metallic sheet, or the like may be used instead of a plastic sheet.

In addition, as shown in FIG. 1, a plurality of the protrusions 3 each having a height of about 0.4 mm are provided on the inner surface of the upper case 1a at a position opposed to the resilient member 12, i.e., in the vicinity of the head insertion port 5.

Accordingly, if the upper case 1a and the lower case 1b are bonded together to assemble a magnetic disk cartridge, the cleaning sheet 7 on the side of the lower case 1b is partially raised by the inclined portion 14 of the resilient member 12, as shown in FIG. 8. At the same time, the raised portion is slightly pushed downwardly by the protrusions 3 on the side the upper case 1a. As a result, the magnetic disk 2 is lightly and resiliently clamped by the upper and lower cleaning sheets 7, 7. As illustrated in FIG. 8, the edge portion of the cleaning sheet 7 on the side of the lower case 1b which is opposed to the head insertion port 5 is not fixed to the lower case 1b and is set free, as described above.

Even if the edge portion of the cleaning sheet 7 is thus set free, since the rotating direction of the magnetic disk 2 is always the same, the edge portion of the cleaning sheet 7 does not get turned up.

The cleaning position C of the disk cartridge in accordance with this embodiment is located within 60 degrees upstream of the central axis X of the head insertion port 5 in the rotating direction of the disk, as shown in FIG. 2. It would be preferable to bring the cleaning position C as close to the head insertion port 5 as possible since the probability of having cleaned the portion of the magnetic disk 2 opposed to the magnetic head becomes highest just before the disk cartridge is inserted into the recording and reproducing apparatus and the magnetic head comes into contact with the magnetic disk 2. However, if a part of the resilient member 12 projects from the head insertion port 5, it will undesirably serve as a hindrance at the time of recording and reproduction, so that it is necessary to bring the resilient member 12 close to the head insertion port 5 to the extent that it does not project therefrom. Hence, it suffices if the cleaning position C is designed to fall within the range of an angle θ, as show in FIG. 2.

In the foregoing embodiment, as shown in FIG. 2, the forward edge of the resilient member 12 and the edge of the cleaning sheet 7 opposed to the head insertion port 5 are not set parallel with each other, but the forward edge of the resilient member 12 and the aforementioned edge of the cleaning sheet 7 may be set parallel by changing the layout and/or configuration of the resilient member 12.

In addition, in the foregoing embodiment, although the protrusions are provided on the upper case 1a and the resilient member 12 is secured to the lower case 1b, the resilient member 12 and the protrusions may conversely be provided on the upper case 1a and the lower case 1b, respectively. In addition, the protrusions 3 may not necessarily be provided. Instead, another resilient member may be provided in place of the protrusions 3.

Furthermore, while in the foregoing embodiment, a description has been given of the case of a magnetic disk cartridge, the present invention is applicable to an optical disk cartridge, a magneto-optical disk cartridge, or other types of disk cartridge.

Since the present invention is arranged as described above, even if a portion of the cleaning sheet lifted by a resilient member becomes slackened by bonding between the upper case and the lower case, the cleaning sheet extends to the downstream side by the slackened portion, because the portion of the cleaning sheet located downstream of the resilient member in the rotating direction of the disk is set free. Therefore creases are not formed.

Furthermore, since the resilient member is provided in the vicinity of the head insertion port, the cleaned tip portion of the disk is capable of passing below the head within a very short period of time after the disk starts rotating. For this reason, even in the case of a recording and reproducing apparatus in which the time until the disk is accessed by the head after insertion of the disk cartridge into the recording and reproducing apparatus is short, the cleaned disk surface can be made to face the head before the disk is accessed by the head.

Thus, it is possible to provide a disk cartridge which is capable of demonstrating a positive cleaning effect and is highly reliable in operation.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cartridge case including an upper case, a lower case and a head insertion aperture at a predetermined position in each of said upper and lower cases;
   a pair of cleaning sheets made of a non-woven fabric, one of said sheets being respectively secured to the inner surface of each of said upper and lower cases;
   a disk having respective surfaces disposed rotatably between said cleaning sheets; and
   at least one resilient member disposed between a corresponding one of said cases and a related one of said cleaning sheets, said resilient member being adapted to provide a cleaning position by pressing said cleaning sheets into direct contact with said surfaces of said disk,
   said resilient member being positioned within 60 degrees upstream of a central axis of said head insertion aperture relative to the rotating direction of said disk such that said cleaning position is provided by an inclined portion of said resilient member located within said 60 degrees.

2. A disk cartridge according to claim 1, wherein a portion of said respective cleaning sheets located downstream of said resilient member in the rotating direction of said disk is freely associated with said corresponding case.

3. A disk cartridge according to claim 1, wherein said resilient member comprises a resilient sheet including a proximal end portion secured to said corresponding case and an inclined portion rising obliquely with respect to an inner surface of said case, said inclined portion being arranged in a direction crossing relative to the rotating direction of said disk.

4. A disk cartridge according to claim 2, wherein said resilient sheet comprises a plastic sheet, and a projection is provided at a position on said inner surface of said corresponding case where said resilient sheet is secured contacting said inclined portion of said resilient sheet, pushing said inclined portion of said resilient sheet higher than said projection against said related cleaning sheet.

5. A disk cartridge according to claim 4, wherein one resilient member is secured to a corresponding one of said cases, and a projection is provided on the other of said cases at a position opposing said resilient member, such that said disk is clamped between said resilient member, said projection and said cleaning sheets.

* * * * *